(12) United States Patent
Issler et al.

(10) Patent No.: US 8,416,839 B2
(45) Date of Patent: Apr. 9, 2013

(54) METHOD OF RECEPTION AND RECEIVER FOR A RADIO NAVIGATION SIGNAL MODULATED BY A CBOC OR TMBOC SPREAD WAVEFORM

(75) Inventors: Jean-Luc Issler, Toulouse (FR); Lionel Ries, Toulouse (FR); Olivier Julien, Toulouse (FR); Christophe MacAbiau, Montauban (FR)

(73) Assignee: Centre National D'Etudes Spatiales (FR)

( * ) Notice: Subject to any disclaimer, the term of this patent is extended or adjusted under 35 U.S.C. 154(b) by 0 days.

(21) Appl. No.: 12/441,799

(22) PCT Filed: Sep. 17, 2007

(86) PCT No.: PCT/EP2007/059765
§ 371 (c)(1),
(2), (4) Date: Sep. 30, 2010

(87) PCT Pub. No.: WO2008/034790
PCT Pub. Date: Mar. 27, 2008

(65) Prior Publication Data
US 2011/0013675 A1    Jan. 20, 2011

(30) Foreign Application Priority Data
Sep. 19, 2006  (FR) .................... 06 53818

(51) Int. Cl.
*H04B 1/00* (2006.01)
(52) U.S. Cl. ........ 375/150; 375/130; 375/147; 375/140; 370/315; 455/98
(58) Field of Classification Search .................. 375/150, 375/130, 147, 140; 370/315; 455/98
See application file for complete search history.

(56) References Cited

U.S. PATENT DOCUMENTS
8,094,071 B2 * 1/2012 Ries et al. ................ 342/357.68
2005/0012664 A1 * 1/2005 Gerein ........................ 342/361
(Continued)

FOREIGN PATENT DOCUMENTS
EP    1681773    7/2006
FR    2902949   12/2007

OTHER PUBLICATIONS

Guenter W. Hein, "MBOC: The New Optimized Spreading Modulation Recommended for GALILEO L1 OS and GPS L1C", IEEE, (2006) pp. 883-892, Apr. 25-27.
International Search Report PCT/EP2007/059765; Dated Jan. 16, 2008.

*Primary Examiner* — Kenneth Lam
(74) *Attorney, Agent, or Firm* — Cantor Colburn LLP (57) ABSTRACT

To receive a radio navigation signal modulated by a modulation waveform, the modulation waveform comprising a component $BOC(n_1,m)$ and a component $BOC(n_2,m)$, $n_2$ being strictly less than $n_1$, a correlation is performed between a prompt local waveform and the modulation waveform and a correlation is performed between a shifted (forward or backward) local waveform and said modulation waveform, over a time interval of duration T. The prompt local waveform is generated in the guise of a binary waveform comprising over said time interval at least one waveform segment $BOC(n_2,m)$ of a total duration of $(1-\alpha_A)T$ over said time interval, $\alpha_A$ being a parameter greater than or equal to 0 and strictly less than 1. The shifted local waveform is generated in the guise of a binary waveform comprising over said time interval at least one waveform segment $BOC(n_1,m)$ of a total duration of $\alpha_B T$ over said time interval, B being a parameter strictly greater than 0 and less than or equal to 1, and $\alpha_A$ being different from $\alpha_B$.

15 Claims, 6 Drawing Sheets

U.S. PATENT DOCUMENTS

2005/0270997 A1* 12/2005 Julien et al. .................. 370/315
2005/0281325 A1* 12/2005 Lillo et al. ................... 375/150
2006/0097915 A1* 5/2006 Martin et al. ............ 342/357.15

* cited by examiner

METHOD OF RECEPTION AND RECEIVER FOR A RADIO NAVIGATION SIGNAL MODULATED BY A CBOC OR TMBOC SPREAD WAVEFORM

FIELD OF THE INVENTION

The present invention relates to a method of receiving and to a receiver for a radionavigation signal modulated by a CBOC ("Composite Binary Offset Carrier") or TMBOC ("Time-Multiplexed Binary Offset Carrier") spreading waveform.

BACKGROUND OF THE INVENTION

Satellite positioning systems such as GPS (Global Positioning System), Galileo, GLONASS, QZSS, Compass, IRNSS and others make use of "spread-spectrum" modulated navigation signals. These signals essentially carry pseudo-random codes made up of numerical sequences which repeat periodically, the main function of which is to permit Code Distribution Multiple Access (CDMA) and the provision of an accurate measurement of the propagation time for the signal transmitted by the satellite. Satellite positioning signals may incidentally also carry useful data.

In the case of GPS, the navigation signals are transmitted in the L1 frequency band, centred on 1575.42 MHz, and L2 frequency band, centred on 1227.6 MHz. The L5 band, centred on 1176.45 MHz, will be added during the modernisation of GPS. The satellites of the Galileo constellation will transmit in the bands: E2-L1-E1 (the median band portion L1 being the same as that for GPS), E5a (which, according to Galileo nomenclature, is the L5 band intended for GPS), E5b (centred on 1207.14 MHz) and E6 (centred on 1278.75 MHz).

The navigation signals are formed by modulating the central (carrier) frequencies. Various modulation schemes have already been established or are at least under consideration for creating navigation signals. In order to ensure interoperability and compatibility between the GPS and Galileo systems, the United States of America and the European Union have agreed upon certain points relating to signal modulation schemes in the L1 band, which is used by both systems. More details about the proposed modulation schemes may be obtained from the publication "MBOC: The New Optimized Spreading Modulation Recommended for GALILEO L1 OS and GPS L1C", Hein et al., Inside GNSS, May/June 2006, pp. 57-65.

One of the modulation schemes selected as a candidate for modulating the Galileo OS L1 signal is known by the name "TMBOC modulation". This type of modulation has moreover already been selected for the L1C GPS signal. The TMBOC spreading waveform modulating the carrier may be described as an alternating succession of segments of a first BOC($n_2$,m) waveform and of segments of a second BOC($n_1$,m) waveform, with $n_1 > n_2$. "BOC" denotes a double offset carrier modulation, the abbreviation standing for "Binary Offset Carrier".

In general, BOC(n,m) is a time function t defined by:

$$\text{BOC}(n,m)(t) = C_m(t) \cdot \text{sign}[\sin(2\pi f_{sc} t)], \quad (1)$$

where $C_m(t)$ is a pseudo-random code of a chip rate m×1.023 Mcps assuming the values +1 or −1 and $f_{sc}$ is the frequency n×1.023 MHz. One condition applying to n and m is that the ratio 2n/m is integral. The TMBOC$_m$($n_1,n_2$) spreading waveform is defined by:

$$TMBOC_m(n_1, n_2)(t) = \begin{cases} C_m(t) \cdot \text{sign}[\sin(2\pi f_{n2} t)], & \text{if } t \in \\ C_m(t) \cdot \text{sign}[\sin(2\pi f_{n1} t)], & \text{if } t \in \end{cases} \quad (2)$$

where $f_{n1} = n_1 \times 1.023$ MHz, $f_{n2} = n_2 \times 1.023$ MHz, where S1 is the union of the "BOC($n_1$,m)" segments and S2 the union of the "BOC($n_2$,m)" segments, S1 and S2 being complementary on the time axis, and where $C_m(t)$ is the pseudo-random code of the signal at a chip rate m×1.023 Mcps and assuming the values +1 or −1. For the GPS L1C and Galileo OS L1 signals, m=1, $n_2=1$ and $n_1=6$ will occur as applicable. The ratio between the length of the "BOC(1,1)" segments and the length of the "BOC(6,1)" segments determines how the power of the signal is distributed between its two components.

Another candidate modulation scheme for modulation of the Galileo OS L1 signal is known by the name "CBOC modulation". The CBOC spreading waveform modulating the carrier is a linear combination of a first BOC($n_2$,m) waveform and a second BOC($n_1$,m) waveform. In this case, a CBOC$_m$($n_1,n_2$) waveform may be written:

$$\text{CBOC}_m(n_1,n_2)(t) = V \cdot \text{BOC}(n_2,m)(t) + W \cdot \text{BOC}(n_1,m)(t), \quad (3)$$

where V and W are real parameters defining the relative weighting of components BOC($n_2$,m) and BOC($n_1$,m). In the case of a CBOC waveform, the two BOC components carry the identical pseudo-random code. If this modulation is selected for Galileo OS L1, m=1, $n_1=6$ and $n_2=1$ will apply.

In order to determine the propagation time of the signal transmitted by a satellite (the pseudo-distance) in a receiver, the method of receiving the signal comprises a correlation stage. It is well known in the technical field to correlate the waveform modulating the radionavigation signal with local replicas of this modulation waveform. The modulation waveform has an at first sight unknown phase which must be determined to calculate the position of the receiver. The method normally proceeds iteratively and begins with an initial estimate of the unknown phase of the modulation waveform. A prompt local replica of the modulation waveform is then generated in the receiver, i.e. a copy of the modulation waveform, the phase of which corresponds to the estimate, which is then correlated with the modulation waveform. In parallel, one or more offset local replicas of the modulation waveform are generated, i.e. one or more copies of the modulation waveform, the phase of which is early or late relative to the estimate. This or these offset local replicas are also correlated with the modulation waveform. The results of these correlations are then used to improve the estimate of the phase of the modulation waveform. The method is then reiterated until the phase has been determined with sufficient precision.

European patent application EP 1 681 773 describes this receiving method in the case of a CBOC type modulation waveform. The incoming signal modulated by a CBOC waveform and a local replica of this CBOC waveform are thus correlated. This solution involves generating a replica CBOC in the receiver. It is therefore necessary to implement four-level quantisation at the correlator input, which requires an at least 2-bit architecture. The same patent application also mentions a second method in which a correlation is performed between the incoming signal and a local replica of the first BOC component and another correlation between the incoming signal and a local replica of the second BOC component. The results of the two correlations are then combined. In this second method, the local replicas are one-bit, which may be considered advantageous relative to the first solution.

The price to be paid is a doubling of the number of correlation operations in comparison with the first solution, all other things being equal.

French patent application 06 05551 presents an improved method and improved receiver for receiving a CBOC signal having a component $BOC(n_1,m)$ and a component $BOC(n_2,m)$, with $n_2<n_1$. In order to perform correlation between a local waveform and the CBOC waveform broadcast by the satellites, over a time interval of duration T, this application proposes generating the local waveform as a binary waveform, formed over said time interval of an alternating succession comprising at least one segment of a $BOC(n_1,m)$ waveform and at least one segment of a $BOC(n_2,m)$ waveform, the at least one segment $BOC(n_1,m)$ having a total duration of $\alpha T$, $\alpha$ being strictly between 0 and 1, the at least one segment $BOC(n_2,m)$ having a total duration $(1-\alpha)T$. In particular, this method does not involve a waveform with more than two levels and neither does it require a higher number of correlators.

Figure 3:
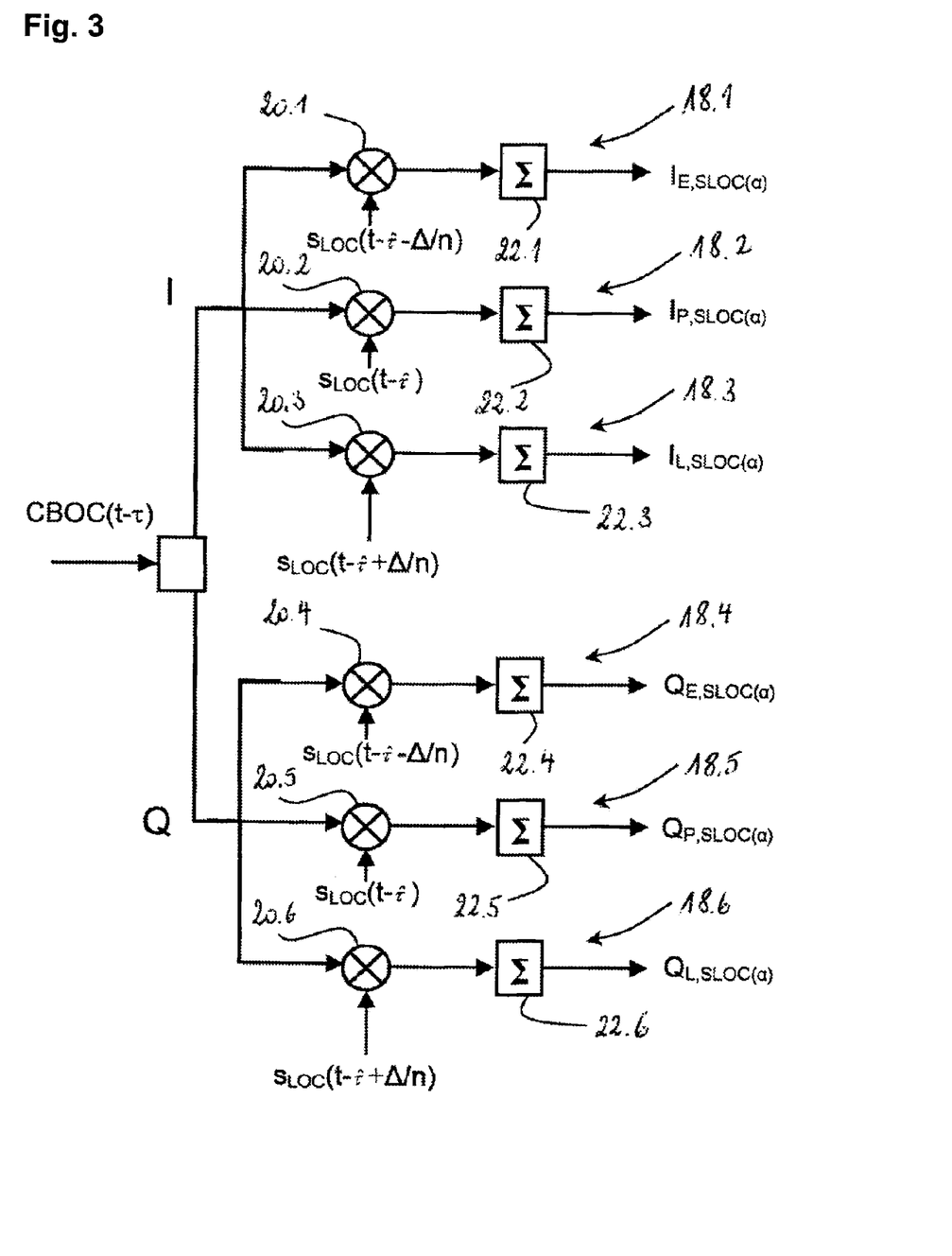
FIG. 3: is a schematic diagram of a receiver using the same local binary waveform in the prompt and offset correlators.

FIG. 3 shows the simplified diagram of a receive channel of a receiver capable of implementing the method described in FR 06 05551. It will be noted that the same local binary waveform $s_{LOC}$ is used to carry out the various correlations.

Figure 4:
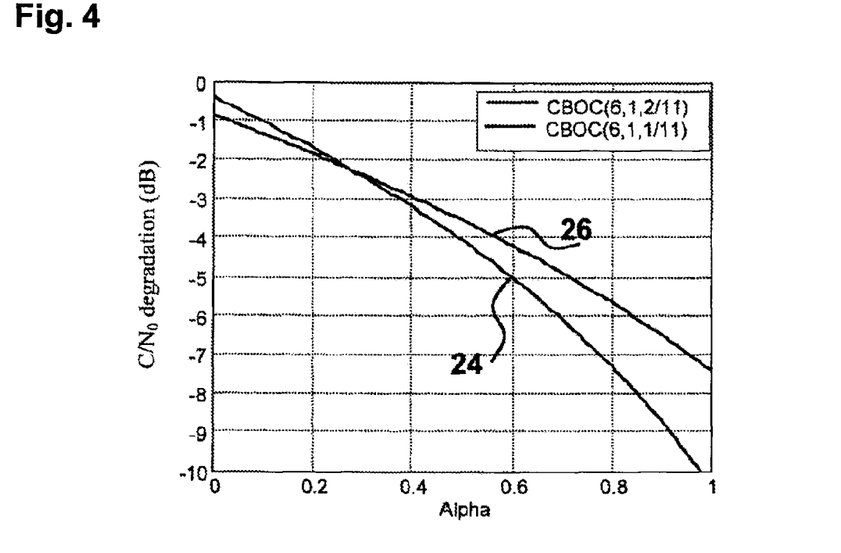
FIG. 4: is a representation of the degradation of the C/$N_0$ ratio as a function of the parameter a, for the receiver of FIG. 3.

On implementation of the method described in FR 06 05551, it is observed, in particular when $m=1$, $n_1=6$ and $n_2=1$, that if $\alpha$ increases, i.e. if the proportion of component BOC (6,1) is increased to the detriment of the proportion of component BOC(1,1) in the local waveform $s_{LOC}$, degradation of the ratio $C/N_0$ (ratio of the power C of the carrier to the spectral noise density $N_0$) becomes more significant, so making signal reception more difficult. Degradation of the $C/N_0$ ratio as a function of the value of the parameter $\alpha$ is shown in FIG. 4 for two types of CBOC modulation waveforms (one with one eleventh of the total power in component BOC(6,1), the other with two elevenths, this power distribution being mentioned by way of example). On the other hand, if $\alpha$ increases, an increase in synchronisation performance ("tracking performance") and better resistance to multipath effects are also observed.

BRIEF DESCRIPTION OF THE INVENTION

The present invention proposes a novel method of receiving a radionavigation signal modulated by a spreading waveform.

In order to receive a radionavigation signal modulated by a modulation waveform, the modulation waveform comprising a component $BOC(n_1,m)$ and a component $BOC(n_2,m)$, $n_2$ being strictly less than $n_1$, correlation is performed, over a time interval of duration T, between a prompt local waveform and the modulation waveform and between an offset local waveform (early or late) and said modulation waveform. According to the invention, said prompt local waveform is generated as a binary waveform comprising over said time interval at least one segment of a $BOC(n_2,m)$ waveform of a total duration of $(1-\alpha_A)T$ over said time interval, $\alpha_A$ being a parameter greater than or equal to 0 and strictly less than 1. Still according to the invention, said offset local waveform is generated as a binary waveform comprising over said time interval at least one segment of a $BOC(n_1,m)$ waveform of a total duration of $\alpha_B T$ over said time interval, $\alpha_B$ being a parameter strictly greater than 0 and less than or equal to 1, and $\alpha_A$ differing from $\alpha_B$. With the exception of those cases in which $\alpha_A=0$, the prompt local waveform comprises, over said time interval, at least one segment of the $BOC(n_1,m)$; the total duration of this at least one segment is $\alpha_A T$. With the exception of those cases in which $\alpha_B=1$, the offset local waveform comprises, over said time interval, at least one segment of the $BOC(n_2,m)$ waveform; the total duration of this at least one segment is $(1-\alpha_B)T$ Since $\alpha_A$ and $\alpha_B$ are different, the prompt and offset local waveforms differ by the proportions of segments $BOC(n_1,m)$ and $BOC(n_2,m)$. Thanks to the invention, it is therefore possible to adjust the prompt and offset waveforms separately in order to achieve improved reception of the radionavigation signal. This makes it possible, to a certain extent, to decouple the improvement in synchronisation performance from the degradation in the $C/N_0$ ratio, while retaining the advantage of local binary waveforms.

In the specific case in which $\alpha_A=0$, the prompt local waveform is a local replica of component $BOC(n_2,m)$ of the composite waveform over said correlation interval. The value of $\alpha_B$ may, in principle, be freely selected within the above-specified range, but preferably from an upper part of this range, e.g. from 0.8 to 1.

In the specific case in which $\alpha_B=1$, the offset local waveform is a local replica of component $BOC(n_1,m)$ of the composite waveform over said time interval. The value of $\alpha_A$ may, in principle, be freely selected within the above-specified range, but preferably from a lower part of this range, e.g. from 0 to 0.2.

Preferably, the value of the parameter $\alpha_A$ is substantially less than the value of the parameter $\alpha_B$. The case where the two conditions $\alpha_A=0$ and $\alpha_B=1$ are met is considered particularly advantageous.

The offset local waveform may comprise an early local waveform and/or a late waveform and/or a difference between an early local waveform and a late local waveform. According to one preferred embodiment of the invention, a correlation is carried out on a prompt channel of a receiver (between the incoming modulation waveform and the prompt local binary waveform), on a "late" channel of the receiver (between the incoming modulation waveform and a late local binary waveform) and on an "early" channel of the receiver (between the incoming modulation waveform and an early local binary waveform). According to another preferred embodiment of the invention, a correlation is carried out, on a first channel, between the incoming modulation waveform and the prompt local binary waveform and, on a second channel, between the incoming modulation waveform and the difference of an early local binary waveform and a late local binary waveform.

It should be noted that the method according to the invention is particularly advantageous for receiving a radionavigation signal modulated by a modulation waveform of the CBOC type, the latter comprising a linear combination with real parameters of component $BOC(n_1,m)$ and of component $BOC(n_2,m)$. However, the method may also be used for receiving a radionavigation signal modulated by a modulation waveform of the TMBOC type, the latter comprising an alternating succession of segments of component $BOC(n_1,m)$ and of segments of component $BOC(n_2,m)$. A receiver capable of implementing the method could therefore equally well receive signals modulated according to the CBOC scheme as signals modulated according to the TMBOC scheme, which would ensure GPS L1C/Galileo OS L1 interoperability even if the CBOC modulation scheme were selected for Galileo OS L1.

A receiver for implementing the method advantageously comprises local waveform generators for generating a prompt local waveform and an offset local waveform together with correlators for performing, over the time interval of duration T, a correlation between the prompt local waveform and the modulation waveform and a correlation between the offset local waveform and the modulation waveform. These local waveform generators are configured to generate said prompt local waveform as a binary waveform comprising over said time interval at least one segment of a BOC($n_2$,m) waveform of a total duration $(1-\alpha_A)T$ over said time interval, $\alpha_A$ being a parameter greater than or equal to 0 and strictly less than 1, and to generate said offset local waveform as a binary waveform comprising over said time interval at least one segment of a BOC($n_1$,m) waveform of a total duration of $\alpha_B T$ over said time interval, $\alpha_B$ being a parameter differing from parameter $\alpha_A$ and strictly greater than 0 and less than or equal to 1.

Preferably, the receiver comprises a prompt local waveform generator, an offset local waveform generator, a first correlator equipped with a mixer for mixing the modulation waveform with the prompt local waveform originating from the prompt local waveform generator and a second correlator equipped with a mixer for mixing the modulation waveform with the offset local waveform originating from the offset local waveform generator.

BRIEF DESCRIPTION OF THE FIGURES

Other details and characteristics of the invention will emerge from the detailed description of advantageous embodiments given below by way of illustration with reference to the appended drawings, in which.

DETAILED DESCRIPTION

Figure 1:
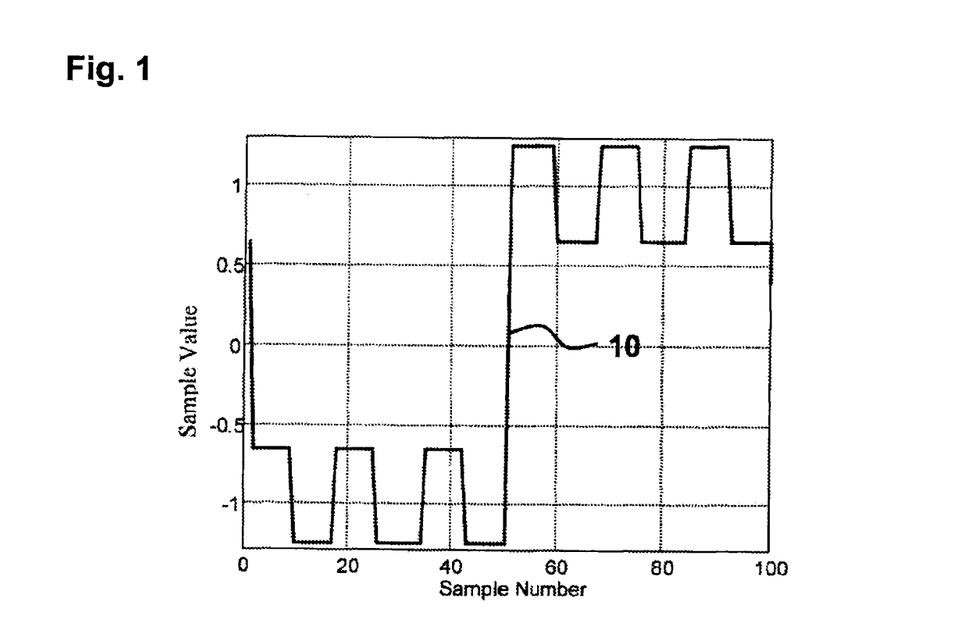
FIG. 1: is a temporal representation of a CBOC(6,1) waveform.

FIG. 1 shows a CBOC(6,1) waveform 10, defined by:

$$\text{CBOC}(6,1)(t) = V \cdot \text{BOC}(1,1)(t) - W \cdot \text{BOC}(6,1)(t) \quad (4)$$

where V and W are the weighting factors. Here and below, the chip rate of the pseudo-random code is set at 1, so allowing us to omit the index "m" in the notations introduced by equations (1)-(3).

Different values of V and W are being considered for the Galileo OS L1 signal, depending on the multiplexing scheme of this signal. The notations CBOC(6,1,1/11), CBOC(6,1,2/11) are, for example, used. The indices "1/11" and "2/11" indicate the multiplexing scheme used for the radionavigation signal and make reference to a certain weighting of the BOC(1,1) and BOC(6,1) components. For CBOC(6,1,1/11), V=0.383998 and W=0.121431; for CBOC(6,1,2/11), V=0.358235 and W=0.168874. A "+" or "−" sign is sometimes used to indicate whether the coefficient W is preceded by a "+" or a "−" in equation (4): e.g. CBOC(6,1,1/11,−) or CBOC(6,1,1/11,+).

Figure 2:
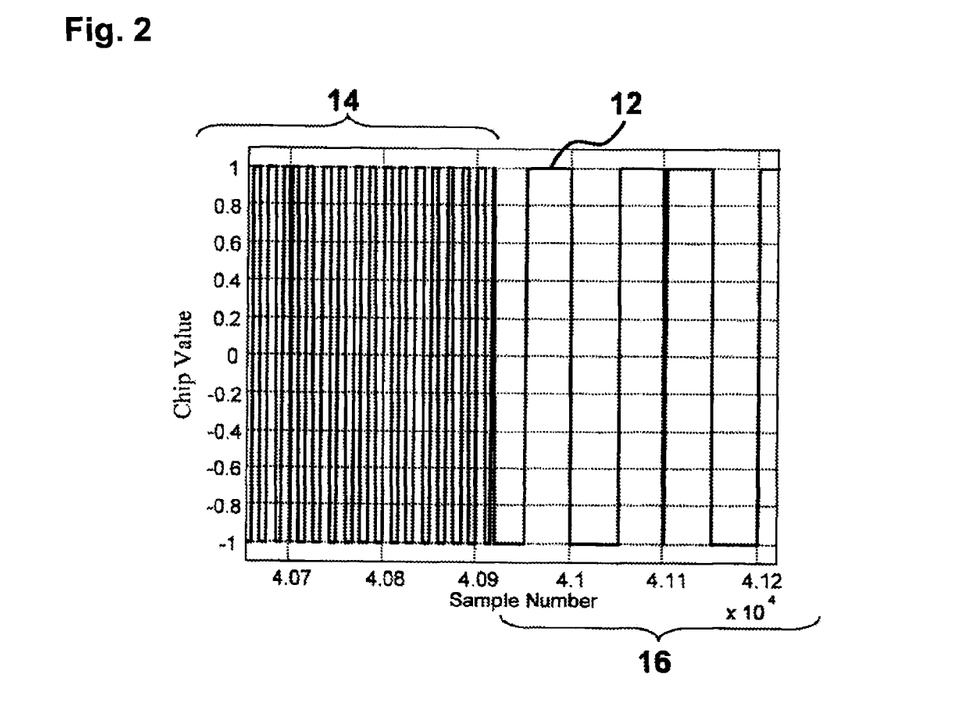
FIG. 2: is a temporal representation of a local binary waveform formed of a succession of BOC(6,1) and BOC(1,1) segments.

In order to provide a better illustration of the advantages of the present invention, we will firstly discuss degradation of the C/$N_0$ ratio, synchronisation performance and multipath resistance in the case of a method of receiving a radionavigation signal which uses the same local binary waveform 12 on the prompt and offset correlation channels, said waveform being formed over the correlation interval (of duration T) by an alternating succession comprising at least one segment of a BOC(6,1) waveform 14 and at least one segment of a BOC(1,1) waveform 16, at least one segment BOC(6,1) 14 having a total duration of $\alpha T$, $\alpha$ being strictly between 0 and 1, the at least one segment BOC(1,1) 16 having a total duration $(1-\alpha)T$. $\beta = 1-\alpha$ and $s_{LOC}(\alpha)$ will be noted as the local binary waveform.

The receiver shown in FIG. 3 comprises correlators 18.1-18.6 each having a mixer 20.1-20.6, which mixes the incoming CBOC type signal with a copy of the local binary waveform $s_{LOC}$ of the type shown in FIG. 2, and an integrator 22.1-22.6 which integrates the mixed signals and produces an output signal. The first "early" correlator 18.1 supplies the value of the correlation $I_{E,SLOC(\alpha)}$ of the in-phase part of the incoming signal CBOC(t−$\tau$) and an "early" copy $s_{LOC}$(t−$\hat{\tau}$−$\Delta/n$) of the local binary waveform $s_{LOC}$. ($\tau$ is the phase of the pseudo-random code of the received signal and $\hat{\tau}$ an estimate of $\tau$, $\Delta$ is the duration of a chip and n determines the fraction of the chip duration by which the copy of the local binary waveform is early relative to the estimate $\hat{\tau}$.) The second correlator 18.2 is a "prompt" correlator which supplies the value $I_{P,SLOC(\alpha)}$ of the correlation of the in-phase part of the incoming signal CBOC(t−T) and of a prompt copy $s_{LOC}$(t−$\hat{\tau}$) of the local binary waveform. The third correlator 18.3 is a "late" correlator which supplies the value $I_{L,SLOC(\alpha)}$ of the correlation of the in-phase part of the incoming signal CBOC(t−$\hat{\tau}$) and a "late" copy $s_{LOC}$(t−$\hat{\tau}$+$\Delta/n$) of the local binary waveform $s_{LOC}$. Correlator 18.4 supplies the value of the correlation $Q_{E,SLOC(\alpha)}$ of the quadrature part of the incoming signal CBOC(t−$\tau$) and an "early" copy $s_{LOC}$(t−$\hat{\tau}$−$\Delta/n$) of the local binary waveform $s_{LOC}$. Correlator 18.5 supplies the value $Q_{P,SLOC(\alpha)}$ of the correlation of the quadrature part of the incoming signal CBOC(t−$\hat{\tau}$) and of a prompt copy $s_{LOC}$(t−$\hat{\tau}$) of the local binary waveform. Correlator 18.6 supplies the value $Q_{L,SLOC(\alpha)}$ of the correlation of the quadrature part of the incoming signal CBOC(t−$\tau$) and of a "late" copy $s_{LOC}$(t−$\hat{\tau}$+$\Delta/n$) of the local binary waveform $s_{LOC}$.

The following correlator output is thus obtained:

$$I_{X,SLOC(\alpha)} = \begin{pmatrix} (\beta V R_{BOC(1,1)}(\varepsilon_\tau + \delta_X) - (\beta W + \alpha V) R_{BOC(1,1)/BOC(6,1)}(\varepsilon_\tau + \delta_X) + \\ \alpha W R_{BOC(6,1)}(\varepsilon_\tau + \delta_X))\cos(\varepsilon_\phi) + r_{X,SLOC(\alpha)} \end{pmatrix} \quad (5)$$

$$Q_{X,SLOC(\alpha)} = \begin{pmatrix} (\beta V R_{BOC(1,1)}(\varepsilon_\tau + \delta_X) - (\beta W + \alpha V) R_{BOC(1,1)/BOC(6,1)}(\varepsilon_\tau + \delta_X) + \\ \alpha W R_{BOC(6,1)}(\varepsilon_\tau + \delta_X))\sin(\varepsilon_\phi) + r_{X,SLOC(\alpha)} \end{pmatrix} \quad (6)$$

where "X" indicates the correlation channel under consideration (X=L: late correlation channel, X=P: prompt correlation channel, X=E: early correlation channel), $R_{BOC(6,1)}$ the autocorrelation function of a BOC(1,1) waveform, $R_{BOC(6,1)}$ the autocorrelation function of a BOC(6,1) waveform and $R_{BOC(1,1)/BOC(6,1)}$ the correlation function between a BOC(1,1) waveform and a BOC(6,1) waveform, $\epsilon_\tau$ the difference between the phase of the local pseudo-random code $\hat{\tau}$, estimate of the phase $\tau$ of the pseudo-random code of the incoming signal, and of the phase $\tau$, $\epsilon_\phi$ the difference between the phase $\phi$ of the carrier of the local signal, estimate of the phase $\hat{\phi}$ of the carrier of the incoming signal, and of the phase $\phi$, $\delta_X = -\Delta/n$ for X=E, $\delta_X=0$ for X=P and $\delta_X=+\Delta/n$ for X=E, and r represents the correlator output noise.

The correlation $R_{CBOC/SLOC(\alpha)}$ of a CBOC waveform defined in (4) and of a local binary waveform $s_{LOC}(\alpha)$ will be considered below:

$$R_{CBOC/SLOC(\alpha)}(t) = (\beta V R_{BOC(1,1)}(t) - (\beta W + \alpha V) R_{BOC(1,1)/BOC(6,1)}(t) + \alpha W R_{BOC(6,1)}(t)) \quad (7)$$

The autocorrelation function $R_{SLOC(\alpha)}$ of the local binary waveform $s_{LOC}(\alpha)$ may be approximated as:

$$R_{SLOC(\alpha)}(t) = \beta R_{BOC(1,1)}(t) + \alpha R_{BOC(6,1)}(t), \quad (8)$$

and the autocorrelation function $R_{CBOC}$ of the CBOC function is written:

$$R_{CBOC}(t) = (V^2 R_{BOC(1,1)}(t) - 2VW R_{BOC(1,1)/BOC(6,1)}(t) + W^2 R_{BOC(6,1)}(t)). \quad (9)$$

Degradation of the $C/N_0$ ratio may be stated as:

$$deg_{C/N0}(\alpha) = \frac{(R_{CBOC/SLOC(\alpha)}(0))^2}{(R_{CBOC}(0))^2} = \frac{(V + \alpha(W-V))^2}{(V^2 + W^2)^2}$$

which means that the greater is the value of $\alpha$, the greater is the loss of correlation signal relative to the case where a CBOC replica is used as a local waveform. Degradation of the $C/N_0$ ratio is shown in FIG. 4 for reception of CBOC(6,1,1/11) (curve 24) and CBOC(6,1,2/11) (curve 26) signals. It will be noted that, in order to obtain degradation of the $C/N_0$ ratio of less than 3 dBs, α must be selected in the range from 0 to 0.4.

The correlator output values are used in a loop to minimise the value of $\epsilon_T$. It is, for example, possible to calculate the scalar D product discriminator (dot product discriminator):

$$D = (I_{E,SLOC(\alpha)} - I_{L,SLOC(\alpha)}) I_{P,SLOC(\alpha)} + (Q_{E,SLOC(\alpha)} - Q_{L,SLOC(\alpha)}) Q_{P,SLOC(\alpha)} \quad (10)$$

The resultant theoretical code tracking error is stated as:

$$\sigma^2_{DP,SLOC(\alpha)} = \frac{B_L(1-0,5B_L T)\tilde{R}_{SLOC(\alpha)}(d)}{\frac{P}{2N_0}\left(\frac{d\tilde{R}_{CBOC/SLOC(\alpha)}(x)}{dx}\bigg|_{x=\frac{d}{2}}\right)^2}\left(1 + \frac{\tilde{R}_{SLOC(\alpha)}(0)}{\frac{PT}{N_0}\tilde{R}^2_{CBOC/SLOC(\alpha)}(0)}\right), \quad (11)$$

where the filtered autocorrelation functions are given by $$\tilde{R}_X(x) = \int_{-B}^{+B} |G_X(f)|^2 e^{-2i\pi fx} df \quad (11')$$

and the filtered intercorrelation functions by $$\tilde{R}_{X/Y}(x) = \int_{-B}^{+B} G_X(f) G_Y^*(f) e^{-2i\pi fx} df. \quad (11'')$$

In the above equations (11)-(11''), B represents the bandwidth of the head filter HF (the filter is here assumed to be rectangular), $B_L$ the band of the DLL loop filter, T the integration time used for correlation, P the power of the used incoming signal; d the spacing between the early local waveform and the late local waveform, $N_0$ the level of the spectral thermal noise density, and $G_X$ the Fourier transform of the waveform X.

Figure 5:
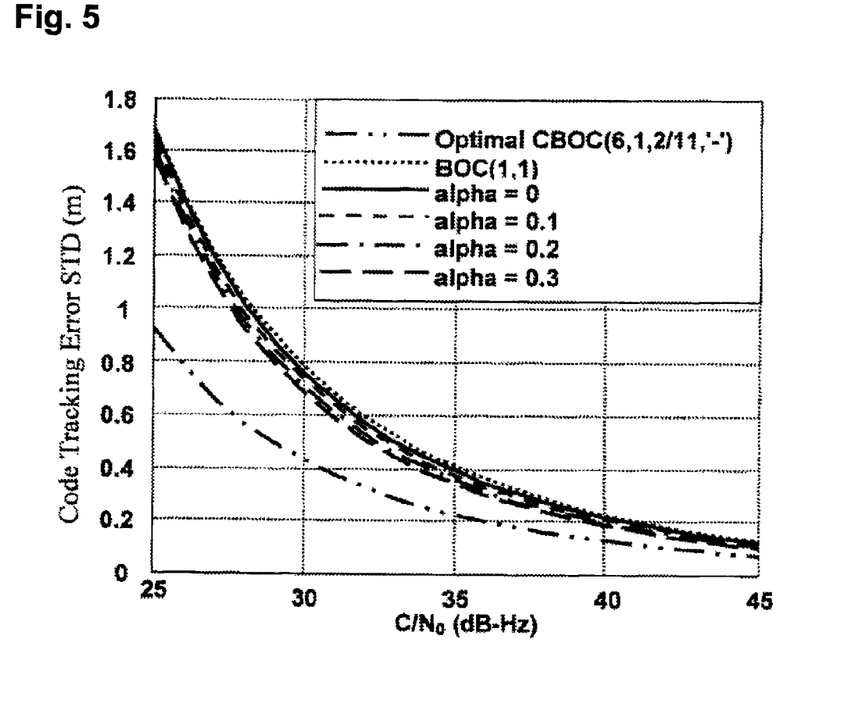
FIG. 5: is a representation of the code tracking error as a function of the C/$N_0$ ratio for the receiver of FIG. 3.

The code tracking error is represented as a function of the $C/N_0$ ratio in FIG. 5 for different values of α, in the case of tracking a CBOC(6,1,2/11,'−') signal, a spacing of 0.1 chips between the early local binary waveform and the late local binary waveform, a 12 MHz input filter (single-sided) and 4 ms of integration time (for correlation). It can be seen that the error diminishes if α increases. In terms of synchronisation performance, it would therefore be advantageous to select α close to 1. It has, in fact, just been seen in the above that, for these values of α, degradation of the $C/N_0$ ratio is considerable.

It will also be noted that, for α=0.2, the multipath envelope is equivalent to that obtained when using a CBOC(6,1,2/11, '−') replica as the local waveform.

Figure 6:
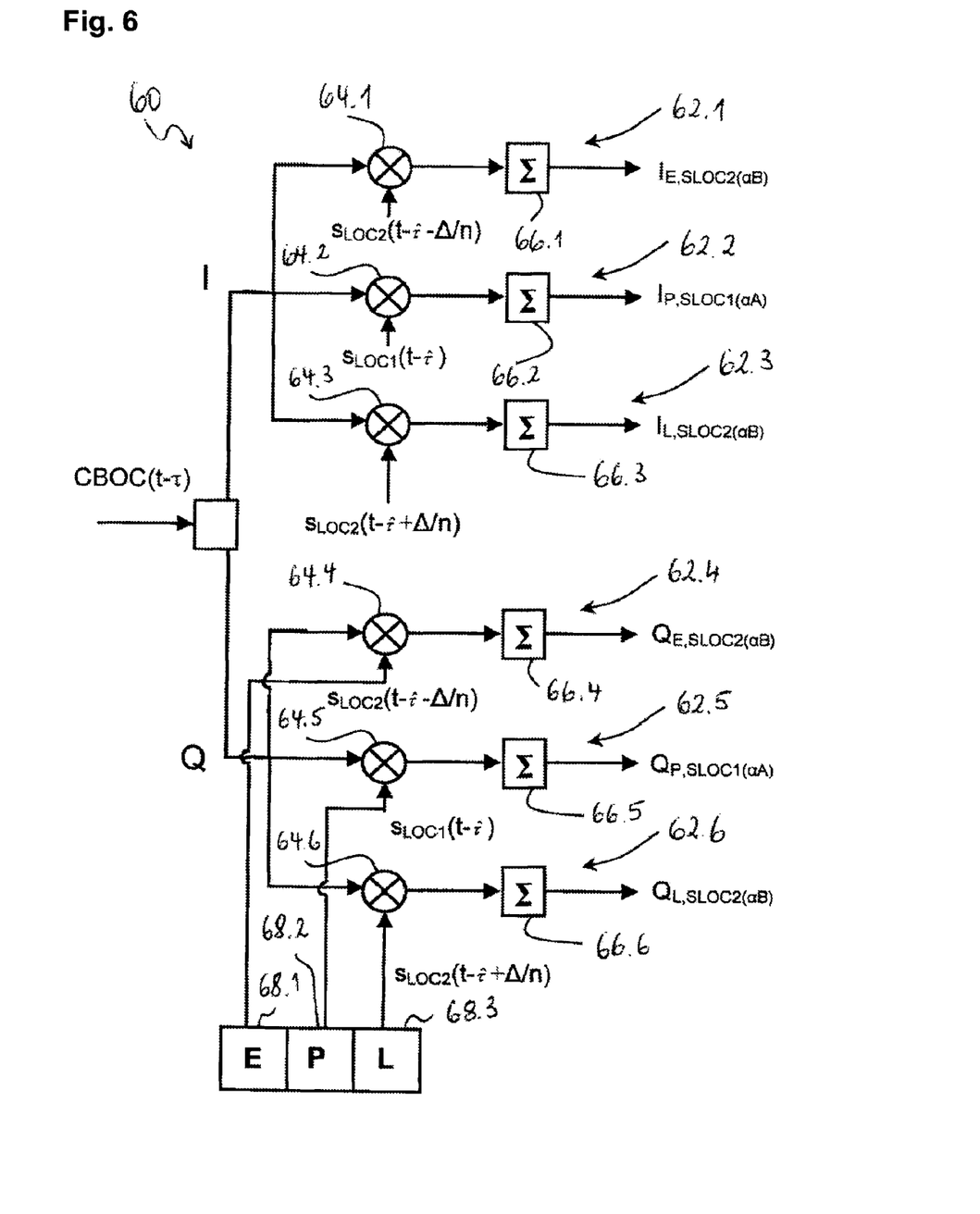
FIG. 6: is a schematic diagram of a receiver capable of implementing the new method.

According to the present invention, different prompt and offset local waveforms are used. This makes it possible to optimise the offset local waveforms independently of the prompt local waveform. FIG. 6 shows a diagram of a first receiver 60 capable of implementing the method. The receiver comprises correlators 62.1-62.6 each having a mixer 64.1-64.6, which mixes the incoming CBOC type signal with a copy of the local binary waveform, and an integrator 66.1-66.6 which integrates the mixed signals and produces an output signal.

The receiver has a set of local binary waveform generators 68.1-68.3. Generator 68.1 generates an early copy $s_{LOC2}(t-\hat{\tau}-\Delta/n)$ of a local binary waveform $s_{LOC2}$. The waveform $s_{LOC2}$ comprises over the correlation interval a segment of a BOC(6,1) waveform of a total duration of $\alpha_B T$ and, if $\alpha_B \neq 1$, a segment of a BOC(1,1) waveform of a duration of $(1-\alpha_B)T$. Below, we will assume that $\alpha_B$ is located in the semi-open interval [0,1], which will allow us to address the specific case of $\alpha_B=1$ at the same time as the other cases. If $\alpha_B=1$, the waveform $s_{LOC2}$ is a pure BOC(6,1) waveform. For values of $\alpha_B$ strictly less than 1, $s_{LOC2}$ also comprises a BOC(1,1) segment and may, for example, have the appearance of waveform 12 of FIG. 2. Generator 68.3 generates a late copy $s_{LOC2}(t-\hat{\tau}+\Delta/n)$ of the local binary waveform $s_{LOC2}$. Generator 68.2 generates a prompt copy $s_{LOC1}(t-\hat{\tau})$ of a local binary waveform $s_{LOC1}$. The waveform $s_{LOC1}$ comprises over the correlation interval a segment of a BOC(1,1) waveform of a total duration of $(1-\alpha_A)T$ and, if $\alpha_A \neq 0$, a segment of a BOC(6,1) waveform of a duration of $\alpha_A T$. Below, we will assume that $\alpha_A$ is located in the semi-open interval [0,1]. If $\alpha_A=0$, the waveform $s_{LOC1}$ is a pure BOC(1,1) waveform. For values of $\alpha_A$ strictly greater than 0, $s_{LOC2}$ also comprises a BOC(6,1) segment and may also have the appearance of waveform 12.

Correlator 62.1 supplies the value of the correlation $I_{E,SLOC2}(t-\tau)$ of the in-phase part of the incoming signal CBOC(t-τ) and of an "early" copy $s_{LOC2}(t-\hat{\tau}-\Delta/n)$ of the local binary waveform $s_{LOC2}$. (As previously, τ is the phase of the pseudo-random code of the received signal and $\hat{\tau}$ an estimate of τ, Δ is the duration of a chip and n determines the fraction of the chip duration by which the copy of the local binary waveform is early relative to the estimate $\hat{\tau}$.) Correlator 62.2 is a "prompt" correlator which supplies the value $I_{P,SLOC1(\alpha A)}$ of the correlation of the in-phase part of the incoming signal CBOC(t–$\tau$) and a prompt copy $s_{LOC1}(t-\hat{\tau})$ of the local binary waveform $s_{LOC1}$. Correlator 62.3 is a "late" correlator, which supplies the value $I_{L,SLOC2(\alpha B)}$ of the correlation of the in-phase part of the incoming signal CBOC(t–$\tau$) and of a "late" copy $s_{LOC2}(t-\hat{\tau}+\Delta/n)$ of the local binary waveform $S_{LOC2}$. Correlator 62.4 supplies the value of the correlation $Q_{E,SLOC2(\alpha B)}$ of the quadrature part of the incoming signal CBOC(t–$\tau$) and an "early" copy $s_{LOC2}(t-\hat{\tau}-\Delta/n)$ of the local binary waveform $s_{LOC2}$. Correlator 62.5 supplies the value $Q_{P,SLOC1(\alpha A)}$ of the correlation of the quadrature part of the incoming signal CBOC(t–$\tau$) and of a prompt copy $s_{LOC1}(t-\hat{\tau})$ of the local binary waveform $s_{LOC1}$. Correlator 62.6 supplies the value $Q_{L,SLOC2(\alpha B)}$ of the correlation of the quadrature part of the incoming signal CBOC(t–$\tau$) and of a "late" copy $s_{LOC2}(t-\hat{\tau}+\Delta/n)$ of the local binary waveform $s_{LOC2}$. For reasons of clarity, FIG. 6 only shows the connections going respectively from generators 68.1, 68.2 and 68.3 to mixers 64.4, 64.5 and 64.6. The connections to mixers 64.1, 64.2 and 64.3 have not been drawn in.

Figure 7:
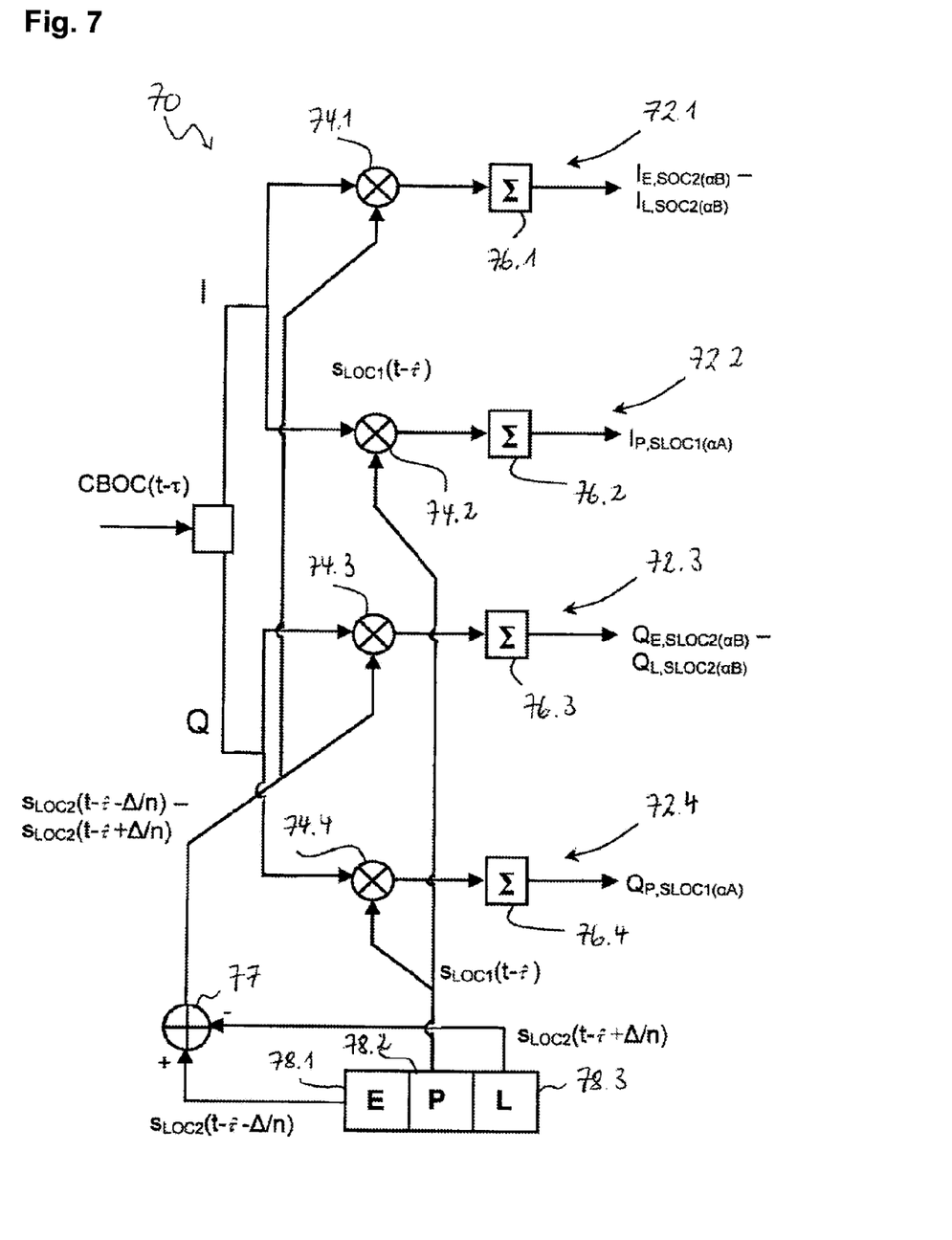
FIG. 7: is a schematic diagram of another receiver capable of implementing the new method.

FIG. 7 shows a schematic diagram of another receiver 70 capable of carrying out the new method. The receiver 70 comprises correlators 72.1-72.4 each having a mixer 74.1-74.4, which mixes the incoming CBOC type signal with a copy of the local binary waveform, and an integrator 76.1-76.4 which integrates the mixed signals and produces an output signal.

The receiver has a set of local binary waveform generators 78.1-78.3. Generator 78.1 generates an early copy $s_{LOC2}(t-\hat{\tau}-\Delta/n)$ of a local binary waveform $s_{LOC2}$. Generator 78.3 generates a late copy $s_{LOC2}(t-\hat{\tau}+\Delta/n)$ of the local binary waveform $s_{LOC2}$. Generator 78.2 generates a prompt copy $s_{LOC1}(t-\hat{\tau})$ of a local binary waveform $s_{LOC1}$. Waveforms $s_{LOC1}$ and $s_{LOC2}$ were defined in the description of FIG. 6. An adder 77 produces the difference between the early copy $s_{LOC2}(t-\hat{\tau}-\Delta/n)$ and late copy $s_{LOC2}(t-\hat{\tau}+\Delta/n)$ of the local waveform $s_{LOC2}$ which it receives from generators 78.1 and 78.3. This difference is input into the mixers 74.1 and 74.3. Correlator 72.3 supplies the value of the correlation $Q_{E,SLOC2(\alpha B)} - Q_{L,SLOC2(\alpha B)}$ of the quadrature part of the incoming signal CBOC(t–$\tau$) and of the difference between the early and late copies of the local binary waveform $s_{LOC2}$. Correlator 72.4 supplies the value $Q_{P,SLOC1(\alpha A)}$ of the correlation of the quadrature part of the incoming signal CBOC(t–$\tau$) and of the prompt copy $s_{LOC1}(t-\hat{\tau})$ of the local binary waveform $s_{LOC1}$.

In both modes of performance of the new method, the scalar product discriminator may be calculated, which is stated as follows:

$$D = (I_{E,SLOC2(\alpha B)} - I_{L,SLOC2(\alpha B)})I_{P,SLOC1(\alpha A)} + (Q_{E,SLOC2(\alpha B)} - Q_{L,SLOC2(\alpha B)})Q_{P,SLOC1(\alpha A)}. \quad (12)$$

For the purpose of receiving a CBOC(6,1,1/11) or CBOC(6,1,2/11) signal, the most important disadvantage of the approach of using the same local binary waveform on the prompt and offset channels was the correlation loss. Thanks to the present invention, the prompt local waveform can be selected with a greater proportion of BOC(1,1), without in so doing reducing the proportion of BOC(6,1) in the early or late local waveforms which improves synchronisation.

Below, we will discuss the specific case $\alpha_A = 0$, i.e. the case in which the prompt local waveform is a BOC(1,1) waveform. The first consequence is that the correlation loss (degradation of the C/N$_0$ ratio) in phase tracking (for which only the prompt correlators are used) is minimal (approximately 0.9 dBs for a CBOC(6,1,2/11) signal and approximately 0.5 dBs for a CBOC(6,1,1/11) signal, as may be seen in FIG. 4).

A theoretical code tracking error is obtained with $\alpha_A = 0$ and the scalar product discriminator:

$$\sigma^2_{DP,SLOC2(\alpha B)} = \qquad (13)$$

$$\frac{B_L(1-0.5B_LT)\tilde{R}_{SLOC2(\alpha B)}(d)}{\frac{P}{2N_0}\left(\frac{d\tilde{R}_{CBOC/SLOC2(\alpha B)}(x)}{dx}\bigg|_{x=\frac{d}{2}}\right)^2}\left(1+\frac{\tilde{R}_{BOC(1,1)}(0)}{\frac{PT}{N_0}\tilde{R}^2_{CBOC/BOC(1,1)}(0)}\right)$$

It will be noted that the square correlation term between the local binary waveform and the BOC(6,1) modulation waveform, present in equation (11), is here replaced by the square term $\tilde{R}^2_{CBOC/BOC(1,1)}(0)$, which is large. Consequently, the quadratic code tracking error diminishes when $\alpha_A$ diminishes.

It is shown that, for a CBOC(6,1,2/11,'−') modulation waveform, the standard deviation of the code tracking error diminishes for all C/N$_0$ ratios if the value of the parameter $\alpha_B$ increases ($\alpha_A = 0$). The best tracking performance is obtained in the extreme case of $\alpha_B = 1$ (pure BOC(6,1) as early and late local waveform).

The theoretical predictions have been verified with the assistance of a simulator with the following settings:

reception of a CBOC(6,1,2/11,'−') signal of a duration of 40 s;

integration time of 4 ms;

DLL loop with carrier assistance and having a bandwidth of 1 Hz;

PLL loop having a bandwidth of 10 Hz, the discriminator being based solely on the quadrature part;

input bandwidth of 10 MHz (one-sided)

Figure 8:
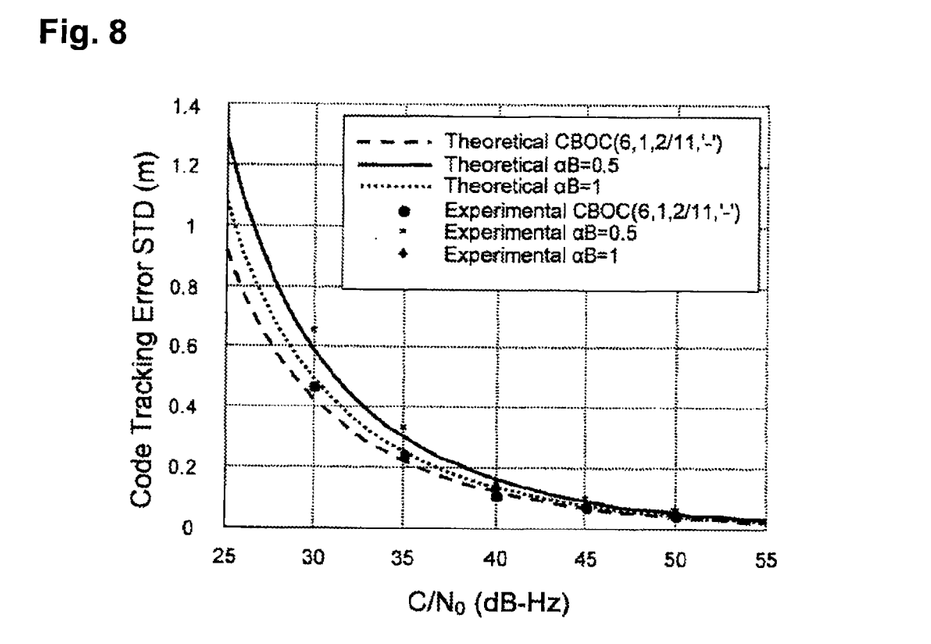
FIG. 8: is a representation of the code tracking error as a function of the C/$N_0$ ratio for the new method, with the condition $\alpha_A=0$ and for different values of $\alpha_B$, and for one comparative case.

The results of the simulations are shown in FIG. 8 and in the following tables:

|  | C/N$_0$ degradation (dB) | | |
| --- | --- | --- | --- |
| C/N$_0$ (dB-Hz) | CBOC | $\alpha_B = 0.5$ | $\alpha_B = 1$ |
| 30 | 0 | −0.50 | −0.49 |
| 35 | 0 | −0.54 | −0.54 |
| 40 | 0 | −0.55 | −0.55 |
| 45 | 0 | −0.56 | −0.56 |
| 50 | 0 | −0.56 | −0.56 |

|  | Standard deviation of code tracking error (m) | | |
| --- | --- | --- | --- |
| C/N$_0$ (dB-Hz) | CBOC | $\alpha_B = 0.5$ | $\alpha_B = 1$ |
| 30 | 0.467 | 0.653 | 0.467 |
| 35 | 0.241 | 0.336 | 0.242 |
| 40 | 0.112 | 0.154 | 0.138 |
| 45 | 0.074 | 0.102 | 0.075 |
| 50 | 0.043 | 0.063 | 0.046 |

| C/N₀ (dB-Hz) | Standard deviation of phase tracking error (rad) | | |
|---|---|---|---|
| | CBOC | $\alpha_B = 0.5$ | $\alpha_B = 1$ |
| 30 | 0.0841 | 0.0904 | 0.0909 |
| 35 | 0.0461 | 0.0492 | 0.0493 |
| 40 | 0.0252 | 0.0267 | 0.0267 |
| 45 | 0.0144 | 0.0154 | 0.0154 |
| 50 | 0.0075 | 0.0079 | 0.0079 |

Figure 9:
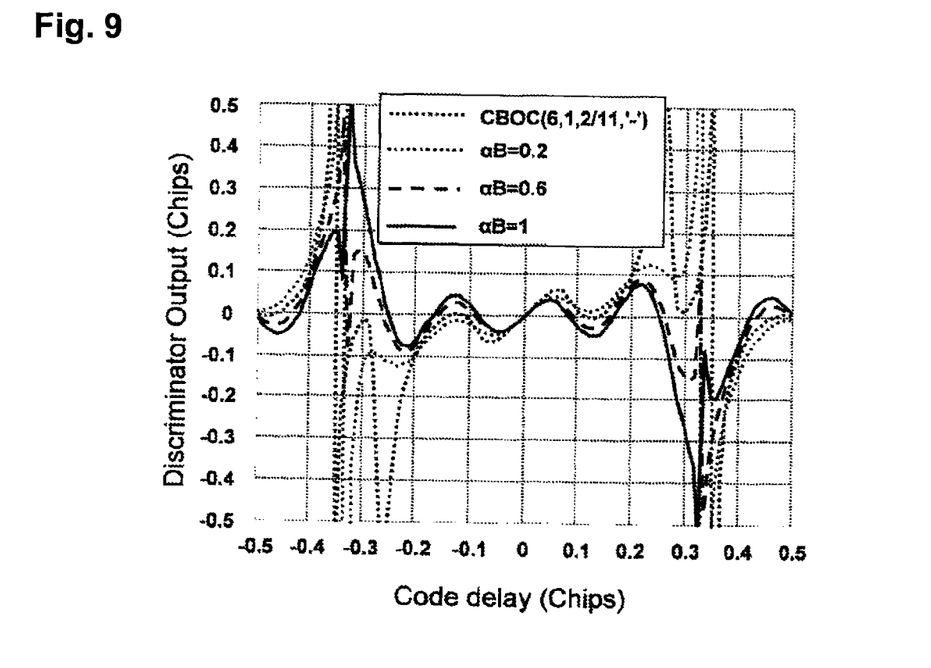
FIG. 9: is a representation of the discriminator output as a function of the time difference between the code of the incoming signal and the local code for the new method, with the condition $\alpha_A=0$ and for different values of $\alpha_B$, and for one comparative case.

FIG. 9 shows the normalised scalar product discriminator (by $(I_{P,SLOC(\alpha A)}^2 + Q_{P,SLOC(\alpha A)}^2 = I_{P,BOC(1,1)}^2 + Q_{P,BOC(1,1)}^2)$ for reception of a CBOC(6,1,2/11,'−') signal for different values of $\alpha_B$. By way of comparison, the curve obtained with a CBOC(6,1,2/11,'−') local waveform is also shown. For elevated values of $\alpha_B$, the false tracking points are more pronounced. An unambiguous tracking method will thus have to be implemented. The curves of FIG. 9 were obtained with the following parameters: spacing of 0.1 chips between the early local binary waveform and the late local binary waveform, a 15 MHz input filter (single-sided) and 4 ms of integration time (for correlation).

With regard to multipath, it is clear that the greater is the proportion of BOC(6,1) in the local binary waveform, the closer the resultant multipath error envelope comes to a multipath error envelope of a local BOC(6,1) waveform. It is difficult to see how performance, in terms of multipath, is affected for values $\alpha_B \geq 0.3$. Nevertheless, it is assumed that performance remains approximately the same. In this case, in the light of the above analysis, it is probably advantageous to use an elevated value of $\alpha_B$, close to 1, or even equal to 1.

In the detailed analysis of the performance of the new method, we have assumed $\alpha_A = 0$. It is obvious that similar performance may be obtained for values of $\alpha_A$ close to, but different from, 0. We also note that optimum selection of $\alpha_A$ and $\alpha_B$ will be substantially dependent on the modulation waveform of the radionavigation signal. This may be a CBOC waveform, as in the detailed description, or alternatively, let it be repeated, a waveform of the TMBOC type, as intended for the L1C GPS signal.

Only the scalar product discriminator was discussed in the analysis. It will, however, be noted that there are other discriminators which may also be used to implement the present invention, in particular an "Early-Minus-Late" or "Prompt" discriminator, for example for detecting the phase of the incoming signal.

It should also be mentioned that, in order to receive several signals transmitted by satellites, a receiver needs a plurality of receive channels. For each receive channel of the receiver, there is a set of correlators as described in the present description, the output signals of which are combined to form, in signal acquisition mode, an estimate of the energy of the received signal and, in signal tracking mode, the discriminator of the pseudo-random code.

The invention claimed is:

1. A method of receiving a radionavigation signal modulated by a modulation waveform, the modulation waveform comprising binary offset carrier (BOC) components, a BOC ($n_1$,m) component and a BOC($n_2$,m) component, $n_1$ differing from $n_2$, the method comprising:

performing a correlation, over a time interval of duration T, between a prompt local waveform and said modulation waveform; and performing, over the time interval of duration T, a correlation between an offset local waveform and said modulation waveform, wherein said prompt local waveform is generated as a binary waveform comprising over said time interval at least one segment of a BOC($n_2$,m) waveform of a total duration of $(1-\alpha A)T$ over said time interval, $\alpha A$ being a parameter greater than or equal to 0 and strictly less than 1, and said offset local waveform is generated as a binary waveform comprising over said time interval at least one segment of a BOC($n_1$,m) waveform of a total duration of $\alpha BT$ over said time interval, $\alpha B$ being a parameter strictly greater than 0 and less than or equal to 1, and the parameters $\alpha A$ and $\alpha B$ being different.

2. A method according to claim 1, in which $\alpha_A$ is equal to 0.

3. A method according to claim 2, in which $\alpha_B$ is equal to 1.

4. A method according to claim 1, in which $\alpha_B$ is equal to 1.

5. A method according to claim 1, in which $\alpha_A$ is less than $\alpha_B$.

6. A method according to claim 1, in which the prompt local waveform comprises over said time interval at least one segment of the BOC($n_1$,m) waveform of a total duration of $\alpha_A T$ over said time interval, $\alpha_A$ being strictly between 0 and 1.

7. A method according to claim 1, in which the offset local waveform comprises over said time interval at least one segment of the BOC($n_2$,m) waveform of a total duration of $(1-\alpha_B)T$ over said time interval, $\alpha_B$ being strictly between 0 and 1.

8. A method according to claim 1, in which said offset local waveform comprises at least on of an early local waveform, a late local waveform, and a difference between an early local waveform and a late local waveform.

9. A method according to claim 1, in which said modulation waveform which modulates the radionavigation signal is a CBOC type modulation waveform, the CBOC type modulation waveform comprising a linear combination with real parameters of the BOC($n_1$,m) component and of the BOC($n_2$,m) component.

10. A method according to claim 1, in which said modulation waveform which modulates the radionavigation signal is a TMBOC type modulation waveform, the TMBOC modulation waveform comprising an alternating succession of segments of the BOC($n_1$,m) component and segments of the BOC($n_2$,m) component.

11. A method according to claim 1, in which $n_1=6$, $n_2=1$ and m=1.

12. A receiver for receiving a radionavigation signal modulated by a modulation waveform, the modulation waveform comprising binary offset carrier (BOC) components, a BOC ($n_1$,m) component and a BOC($n_2$,m) component, $n_1$ differing from $n_2$, said receiver comprising:

local waveform generators for generating a prompt local waveform and an offset local waveform together with correlators for performing, over a time interval of duration T, a correlation between the prompt local waveform and the modulation waveform and a correlation between the offset local waveform and the modulation waveform;

said local waveform generators being configured to generate said prompt local waveform as a binary waveform comprising over said time interval at least one segment of a BOC($n_2$,m) waveform of a total duration of $(1-\alpha_A)T$ over said time interval, $\alpha_A$ being a parameter greater than or equal to 0 and strictly less than 1, and to generate said offset local waveform as a binary waveform comprising over said time interval at least one segment of a BOC ($n_1$,m) waveform of a total duration of $\alpha_B T$ over said time interval, $\alpha_B$ being a parameter differing from parameter $\alpha_A$ and strictly greater than 0 and less than or equal to 1.

13. A receiver according to claim 12, comprising a prompt local waveform generator, an offset local waveform generator, a first correlator equipped with a mixer for mixing the modulation waveform with the prompt local waveform and a second correlator equipped with a mixer for mixing the modulation waveform with the offset local waveform.

14. A receiver for receiving a radionavigation signal modulated by a modulation waveform, the modulation waveform comprising binary offset carrier (BOC) components, a BOC $(n_1,m)$ component and a BOC$(n_2,m)$ component, $n_1$ differing from $n_2$, said receiver comprising:

local waveform generators generating a prompt local waveform and an offset local waveform; and correlators performing, over a time interval of duration T, a correlation between the prompt local waveform and the modulation waveform and a correlation between the offset local waveform and the modulation waveform;

said local waveform generators generating said prompt local waveform as a binary waveform comprising over said time interval at least one segment of a BOC$(n_2,m)$ waveform of a total duration of $(1-\alpha_A)$T over said time interval, $\alpha_A$ being a parameter greater than or equal to 0 and strictly less than 1, and generating said offset local waveform as a binary waveform comprising over said time interval at least one segment of a BOC$(n_1,m)$ waveform of a total duration of $\alpha_B$T over said time interval, $\alpha_B$ being a parameter differing from parameter $\alpha_A$ and strictly greater than 0 and less than or equal to 1.

15. A receiver according to claim 14, comprising a prompt local waveform generator, an offset local waveform generator, a first correlator equipped with a mixer, which mixes the modulation waveform with the prompt local waveform, and a second correlator equipped with a mixer, which mixes the modulation waveform with the offset local waveform.

* * * * *